Jan. 2, 1968 ÅKE S. GIDLUND 3,361,046
DEVICE FOR RECORDING X-RAY PHOTOGRAPHS
Filed July 16, 1965 3 Sheets-Sheet 1

INVENTOR.
ÅKE SAMUEL GIDLUND
BY
his ATTORNEYS

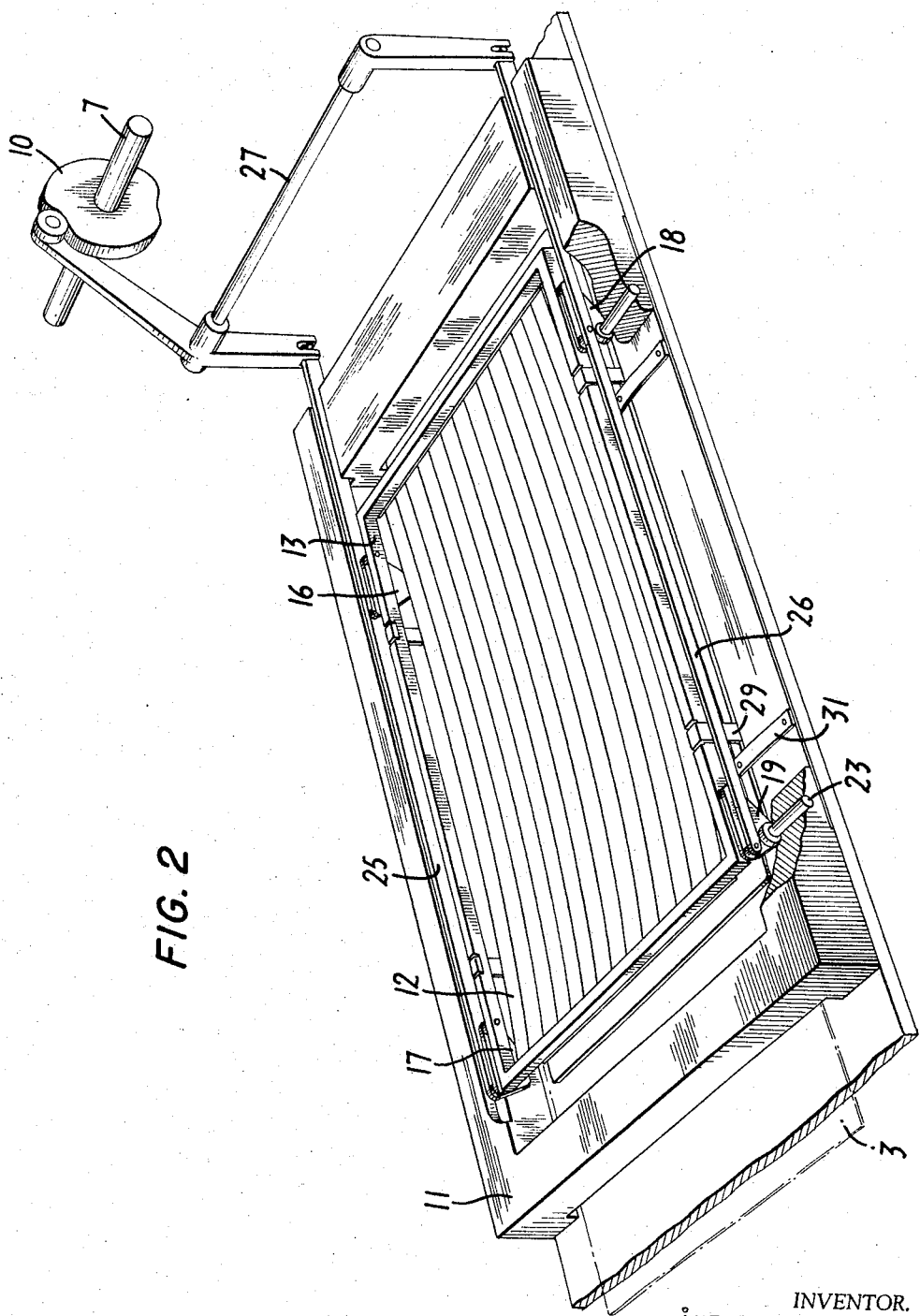

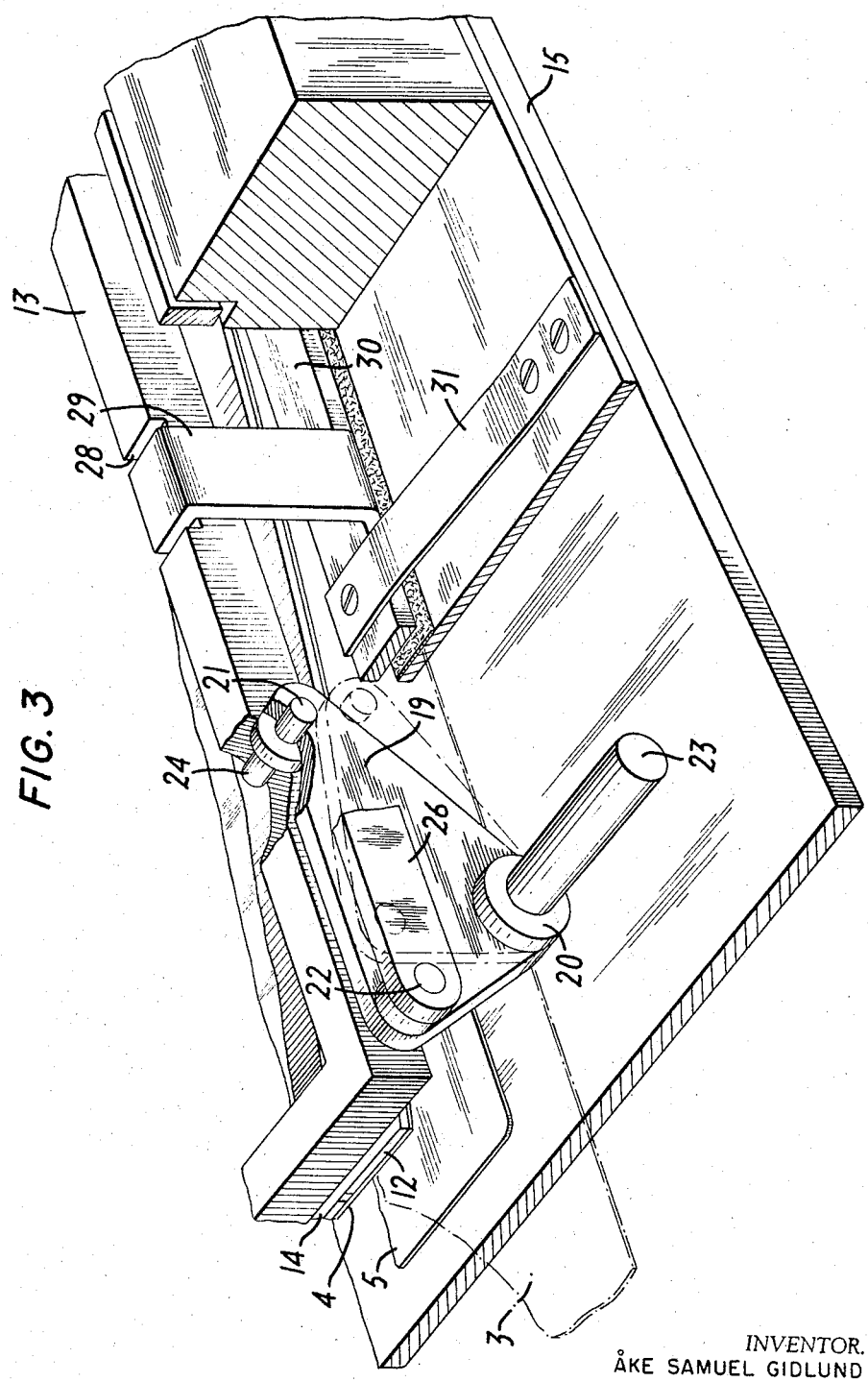

United States Patent Office 3,361,046
Patented Jan. 2, 1968

3,361,046
DEVICE FOR RECORDING X-RAY
PHOTOGRAPHS
Åke Samuel Gidlund, Lokevagen 13B,
Djurskolm, Sweden
Filed July 16, 1965, Ser. No. 473,276
12 Claims. (Cl. 95—73)

ABSTRACT OF THE DISCLOSURE

The disclosure herein relates to apparatus for series recording of X-ray photographs adjacent a picture amplifier wherein a moving roll of film is intermittently fed between the examined subject and the picture amplifier of a television chain, braked after each intermittent movement, supported fully on both its flat surfaces and exposed to an X-ray picture of the examined subject only when a portion of the film is so supported.

---

The present invention relates to a method and a device for serial exposure recording of X-ray photographs adjacent an X-ray television unit.

The purpose of the present invention is to make it possible to expose a series of photographs adjacent an X-ray television unit at picture speeds of up to five pictures per second, while, prior to and even during the exposure period, the whole X-ray sequence including the diffusion of the contrast agent can be followed directly on the television screen. In this way, X-ray pictures can be taken of the desired area of the patient at certain transitory phases of a multi-step operation. The roll of film is situated between the subject being examined and the picture amplifier of the television chain and when practicing this invention good dispersion and very good picture sharpness are obtained. Further, the diffusion of the contrast agent can be observed on the television screen even during the picture exposure period.

It is an important feature of this invention that the film be fully supported on both sides during exposure to the X-ray photographs. Thus the invention is mainly characterized by the fact that a roll film is fed from the magazine via a feeder to a film planisher situated under the picture amplifier of the television chain. The film planisher itself is comprised of two spaced intensifying screens having a phosphor coating arranged on either side of the film web, which can be brought into abutment against the roll of film situated between them for every exposure period.

The compressing of the film between the intensifying screens is an important part of this invention because the screens must be directly in contact with the film over both of its surfaces in order to obtain a clear picture. Otherwise the air remaining between the screens causes distortion of the picture and results in undesired shadow effects on the picture.

More specifically, the device for carrying out the method according to this invention comprises mainly a stand arranged on the picture amplifier, where the stand contains spools for winding and unwinding the roll film, a feeder for controlling the movement of the roll of film and a film planisher operated by the feeder and situated in front of the picture amplifier. As mentioned above the film planisher is comprised of two intensifying screens located on either side of the roll film and adapted to be brought, for each exposure, into abutment against the roll film situated between them.

Other objects and a fuller understanding of this invention may be had by referring to the following detailed description and claims taken in conjunction with the accompanying drawing, in which:

FIG. 2 is a perspective view of the film planishing portion of the recording device shown in FIG. 1; and FIG. 3 is a detailed, partial perspective view of the film planishing device shown in FIG. 2.

Figure 1:
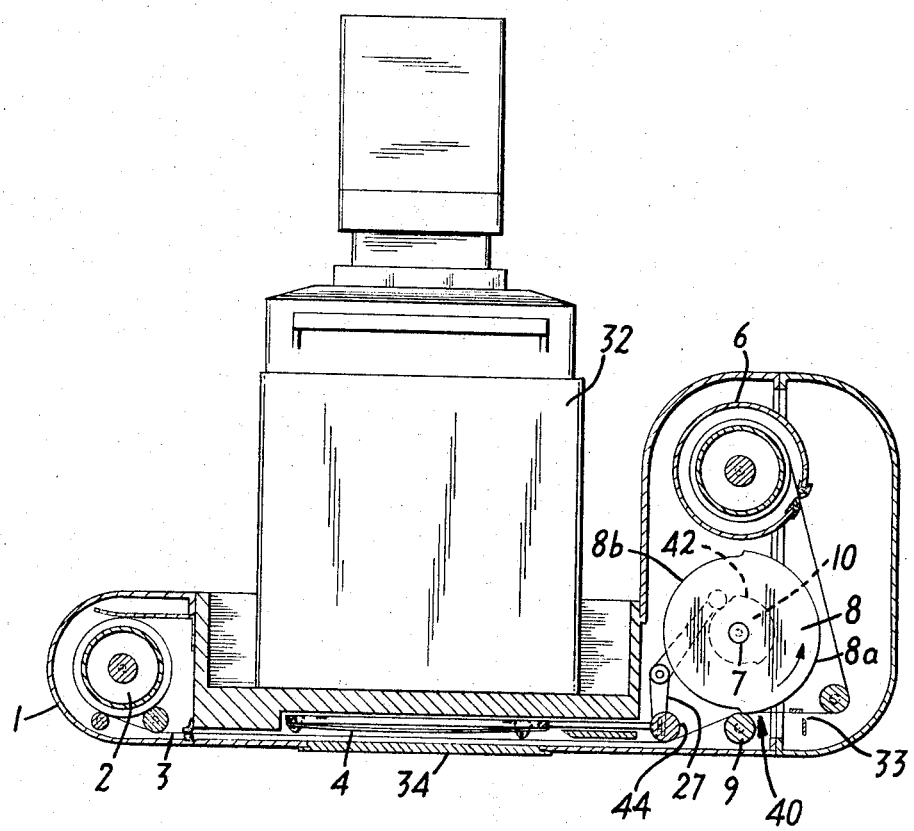
FIG. 1 shows a cross-sectioned elevational view of an X-ray photograph recording device incorporating the invention.

With reference to the drawings, and in particular to FIG. 1, a daylight magazine illustrated by reference character 1, is shown containing a spool 2 for unexposed film 3. The film 3 runs from the magazine 1 via pulleys through two intensifying screens 4 and 5, arranged on either side of the film plane and situated in front of the picture amplifier 32 of the television chain, and via a feeder 40 to a magazine 6.

As shown in FIG. 1, the feeder 40 comprises a semi-wheel 8 rotatably journaled on a main shaft 7, the semi-wheel having two different radii 8a and 8b, respectively. When feeding the film 3, the greater radius 8a of the semi-wheel 8 cooperates with a counter roller 9 situated on the opposite side of the film 3. Thus the irregular radius and unsymmetrical shape of the semi-wheel 8 causes an intermittent feeding of the roll of film 3, i.e., the feeding movement is interrupted when the small radius 8b of the semi-wheel 8 is opposite but spaced from the counter roller 9.

On the main shaft 7 there is also a programming means 10 which in the preferred embodiment is shown in phantom as a second semi-wheel 42 which cooperates in synchronism with the semi-wheel 8 when controlling the approach of screens 4 and 5 through a lever system 27.

In addition, between the counter roller 9 and the magazine 6 there is arranged a cutting station 33 comprising two knives, one situated on each side of the film web 3.

The film planishing device is arranged in a stand 11 and is comprised of a movable intensifying screen 4 and a fixed intensifying screen 5 between which the film 3 runs. The planishing of the film 3 required for each exposure is obtained by moving intensifying screen 4 toward and into engagement with stationary screen 5. Screen 4 moves with, and is fastened to, the under side of pretensioned arcuate aluminum strips 12 which are attached to the underside of a frame 13 at the short sides by means of interlinings 14 composed of an elastic material, such as rubber or the like. On the other side of film 3 the stationary intensifying screen 5 is preferably attached to the stand 11 by means of a Bakelite plate 15, under which there is arranged a secondary diaphragm 34.

On each of the two longitudinal sides of the frame 13 there are arranged two suspension joints 16 and 17, and 18 and 19, one in the vicinity of each corner and each being provided with three attachment points 20, 21 and 22. Each suspension joint is, by means of a pin 23 arranged in the attachment point 20, mounted in the stand 11 and, by means of a pin 24 in the attachment point 21, carried in the frame 13. The attachment points 22 of suspension joints 16 and 17 which are on one longitudinal side of the frame 13, and the attachment points 22 of suspension joints 18 and 19, which are on the other longitudinal side of frame 13, are attached draw rows 25 and 26, respectively. The draw rods 25 and 26 are, in turn, operated by means of the programming means 10 via a common lever system 27.

In order to obtain a soft braking of the film feeding there are arranged two friction coating units 30, which when the frame 13 is moved towards the intensifying screen 5, are simultaneously brought into engagement with a portion of the longitudinal sides of the film 3 prior to each successive exposure period by means of drivers 29 which are suspended in notches 28 on the longitudinal sides of the frame 13. Each friction coating unit 30 in the preferred embodiment is provided with two drivers 29, each of which preferably is positioned in the vicinity of one of the suspension joints 16, 17, 18 and 19. In addition, the two drivers 29 in each friction coating unit 30 are arranged on the same longitudinal side of the frame 13.

Adjacent each driver 29 there is positioned a resilient means 31, e.g. in the form of a blade spring having one of its ends attached to the stand 11 and the other end fastened to the upper side of the friction coating unit 30. Thus by means of drivers 29 and resilient means 31, the friction coating units 30 are brought simultaneously out of engagement with the film 3 when the frame 13 is lifted, and simultaneously into braking engagement with the film 3 when the screen 4, before each exposure, is brought into abutment against the film 3. Thus the film 3 will be completely stopped before the screens eventually are brought into abutment against the film square to be exposed. After exposure, the drivers 29 are lifted together with the friction coating units 30, as the frame 13 is lifted whereupon the exposed film square may be advanced.

The device functions in the following way. Before the daylight magazine 1 is ready to deliver unexposed film 3, a piece of the film 3 is extracted and inserted between the screens 4 and 5 which are arranged under the picture amplifier 32 of the television chain. The piece of film 3 is then moved past a pulley 44 arranged on the other side of the stand 11 and moved into the feeder device 40. The film 3 may then by means of a crank (not shown) on the main shaft 7, be fed to the daylight magazine 6 where the film is attached to the spool. The device then is ready for exposure.

After the patient has been placed in position for the serial examination the diffusion of the contrast medium can be followed on the television screen and X-ray pictures can be taken at any time at an exposure rate of 5 pictures per second. During the adjustment phase the secondary diaphragm 34 is removed and thus a lower X-ray flow is quite sufficient in order to study the passage of the contrast medium. Accordingly, the X-ray amount passing through the patient during the adjustment phase can be held on a low level. Thus it is possible to check the position of catheters or the like as well as the position of the patient in relation to the passage of the contrast medium by means of the television screen immediately before the picture recording.

During the picture recording the secondary diaphragm (anti-diffusing screen) 34 is replaced and the amount of X-rays is increased about six times. Under this very short recording period one can still follow the passage of the contrast medium on the television screen, even if the image on this screen is somewhat more diffuse than before. Although the television primarily serves for the guidance during the adjustment of the device, one can still follow the X-ray procedure on the television screen and the distribution of the contrast agent in the vein paths. The flow of X-rays for each exposure can be regulated in many ways by well-known standard means.

When a picture recording is to be carried out, the screens 4 and 5 are brought into abutment against the roll film 3, which is situated between them by means of an impulse from the programming means 10. Before the screens 4 and 5 abut against the film 3, the feeding movement of the film 3 is completely stopped because the smaller radius 8b of the semi-wheel 8, and not the larger radius 8a, is now situated in front of the counter roller 9. The programming means 10 arranged on the main shaft 7 cooperates in synchronism with the semi-wheel 8 and influences, via the lever system 27 and the draw rods 25, 26, each suspension joint 16, 17, 18 and 19 in such a way that the frame 13, and thus also the screen 4, are moved in the direction towards the screen 5. Thus each suspension joint 16, 17, 18 and 19 is moved to the position shown in phantom in FIG. 3. Also, as the upper screen 4 by means of the draw rods 25 and 26 is moved towards the screen 5, the friction coating units 30 are moved simultaneously against the moving film 3 just after the feeding operation of counter roller 9 ceases, thereby providing a smooth braking of the feeding motion. Thus, by both the disengaging of counter roller 9 and the braking action of the friction coating units 30, the feeding is stopped completely before the screen 4 engages the film 3.

It is very important that the air existing between the screens 4 and 5 is completely removed before the exposure takes place since, otherwise, undesirable shadows are present in the X-ray pictures. The removal of the air is greatly facilitated by the fact that the upper screen 5 is shaped like an arc in such a way that it will first engage the plane of screen 4 with the apex of its downwardly curved central portion. Thus, the air between the screens will successively be pressed from the central portion towards the sides of the frame 13.

In addition, in view of the fact that the upper screen 4 is divided into a number of longitudinal strips 12, each of which is prestressed and supported on frame 13 by an elastic material 14, a perfect fit with the lower screen and thus an excellent planishing of the film situated between the screens is obtained. As soon as the screen approach is finished, the exposure takes place and the return of which is prestressed and supported on frame 13 by gramming means 10.

Instead of the arcuate pretension strips 12, which are carrying the screen 4, an unpretensioned metal sheet, e.g. aluminum, covering the screen 4 can be used. In addition, as another alternative, the longitudinal strips can be arranged corrugatedly beside each other.

Although the invention has been described with a certain degree of particularity, it is to be understood that the present disclosure is made only by way of example and that numerous changes in the details of construction and the combination of arrangements of parts may be resorted to without departing from the spirit and scope of the invention as hereafter claimed.

I claim:
1. An apparatus suitable for series recording of X-ray photographs and mountable on a picture amplifier comprising:
   a supporting means attachable to said picture amplifier,
   a roll of film movably supported on said supporting means,
   a film planishing device attached to said supporting means and positioned between said picture amplifier and said X-ray subject comprising intensifying screens arranged on either side of said film and means for moving each of said screens, prior to said exposure, into abutment against said roll of film positioned between said screens,
   means for intermittently feeding said roll of film to said film planishing device where said film is exposed and the X-ray photographs recorded.
2. An apparatus suitable for series recording of X-ray photographs as defined in claim 1, further comprising braking means for stopping the movement of the film between said screens whenever the two screens approach the film.
3. An apparatus suitable for series recording of X-ray photographs as defined in claim 2 wherein said braking means comprises:
   means for presenting a friction surface to said film as it passes through said planishing device, said friction surface means being attached to said supporting means and extending along the edge of one of the two flat surfaces of said roll of film, and
   movable means attached to said planishing device for engaging the second flat side of said film opposite said friction surface means whenever said two in- tensifying screens of said planishing device are moved toward each other, thereby braking the film moving between said screens.

4. An apparatus suitable for series recording of X-ray photographs as defined in claim 1, further comprising spools rotatably attached to said supporting means for winding and unwinding the roll of film.

5. An apparatus suitable for series recording of X-ray photographs as defined in claim 1 wherein said means for intermittently feeding said roll of film to said film planishing device comprises:
 a main shaft attached to said supporting means,
 a semi-wheel rotatably journaled on said main shaft, said semi-wheel having two portions, one with a larger radius, and one with a smaller radius, and
 a counter roller arranged on the opposite side of said roll of film, said counter roller engageable with the portion of said semi-wheel having a larger radius when said film is being fed into film planishing device and said counter roller spaced from the portion of semi-wheel having a smaller radius when said film is stationary and positioned for exposure in said film planishing device.

6. An apparatus suitable for series recording of X-ray photographs as defined in claim 5 wherein said film planishing device comprises:
 a movable first intensifying screen supported by said supporting means,
 a stationary second intensifying screen fastened to said supporting means,
 a programming means arranged on said main shaft and synchronized with the movement of said semi-wheels, and
 a lever system connecting said programming means with said movable first intensifying screen for guiding the movement of said movable screen.

7. An apparatus suitable for series recording of X-ray photographs as defined in claim 6 wherein said lever system comprises a plurality of suspension joints each of which has three spaced attachment points, the first attachment point of each joint being rotatably fastened to said supporting means, the second attachment point being rotatably attached to said movable first intensifying screen, and the third attachment point being rotatably connected to said programming means.

8. An apparatus suitable for series recording of X-ray photographs as defined in claim 1 wherein said film planishing device comprises:
 a movable first intensifying screen supported by said supporting means,
 a stationary second intensifying screen fastened to said supporting means, and
 a programming means arranged on said supporting means for synchronizing the movement of said movable first intensifying screen with the said means for feeding the film to a position between said first and second intensifying screens.

9. An apparatus suitable for series recording of X-ray photographs as defined in claim 8 wherein said movable first intensifying screen comprises:
 a movable frame,
 an arcuately, pretensioned support mounted within said frame, and
 a flexible engageable screen fastened on said pretensioned support, said frame, support, and flexible screen being movable to a position abutting said stationary second intensifying screen by said programming means whereby the air present between the screens at the screens approach is pressed out from between the central portions of the screens toward the sides as said arcuately pretensioned support and said flexible screen attached to said support both yield slightly after engaging the film adjacent said stationary screen.

10. An apparatus suitable for series recording of X-ray photographs as defined in claim 9 wherein said frame is rectangular and has interlinings of an elastic material such as rubber and foam plastic, which interlinings are adjacent the short sides of said frame for attaching said arcuately pretensioned support to said frame.

11. An apparatus suitable for series recording of X-ray photographs as defined in claim 10 wherein said arcuately pretensioned support comprises arcuately pretensioned sheet metal.

12. An apparatus suitable for series recording of X-ray photographs as defined in claim 11 wherein said arcuately pretensioned support comprises a plurality of arcuately pretensioned aluminum strips arranged side by side in the longitudinal direction of said frame.

References Cited

UNITED STATES PATENTS 2,396,874  3/1946  Nagel et al. _____ 88—24 X
2,972,681  2/1961  Lusby et al.

NORTON ANSHER, Primary Examiner.

RICHARD A. WINTERCORN, Assistant Examiner.

UNITED STATES PATENT OFFICE
CERTIFICATE OF CORRECTION

Patent No. 3,361,046  January 2, 1968

Åke Samuel Gidlund

It is hereby certified that error appears in the above numbered patent requiring correction and that the said Letters Patent should read as corrected below.

Column 4, lines 29 and 30, for "which is prestressed and supported on frame 13 by gramming means 10." read -- the screen 4 then is similarly governed by the programming means 10. --.

Signed and sealed this 6th day of May 1969.

(SEAL)
Attest:

Edward M. Fletcher, Jr.
Attesting Officer

Commissioner of Patents

UNITED STATES PATENT OFFICE
CERTIFICATE OF CORRECTION

Patent No. 3,361,046                          January 2, 1968

Åke Samuel Gidlund

It is certified that error appears in the above identified patent and that said Letters Patent are hereby corrected as shown below:

Column 4, line 16, "5" should read -- 4 --; line 18, "4" should read -- 5 --.

Signed and sealed this 3rd day of March 1970.

(SEAL)
Attest:

Edward M. Fletcher, Jr.                    WILLIAM E. SCHUYLER, JR.
Attesting Officer                              Commissioner of Patents